(12) United States Patent
Kuo (10) Patent No.: US 8,628,665 B2
(45) Date of Patent: Jan. 14, 2014

(54) WATER TREATMENT APPARATUS

(75) Inventor: Chi-Chang Kuo, Taichung (TW)

(73) Assignee: New Century Membrane Technology Co., Ltd., Taichung (TW)

( * ) Notice: Subject to any disclaimer, the term of this patent is extended or adjusted under 35 U.S.C. 154(b) by 183 days.

(21) Appl. No.: 13/241,727

(22) Filed: Sep. 23, 2011

(65) Prior Publication Data

US 2013/0075323 A1     Mar. 28, 2013

(51) Int. Cl.
*B01D 33/00* (2006.01)
*B01D 33/46* (2006.01)
*C02F 1/00* (2006.01)

(52) U.S. Cl.
USPC ........... 210/327; 210/780; 210/791; 210/324; 210/330; 210/331; 210/332; 210/334; 210/357; 210/396; 210/407

(58) Field of Classification Search
USPC ................. 210/327, 330, 331, 332, 334, 357
See application file for complete search history.

(56) References Cited

U.S. PATENT DOCUMENTS

| | | | | | |
|---|---|---|---|---|---|
| 1,680,029 | A | * | 8/1928 | Sweetland | 210/312 |
| 2,269,725 | A | * | 1/1942 | Malanowski | 210/327 |
| 3,857,786 | A | * | 12/1974 | Wolf, Jr. | 210/331 |
| 3,985,656 | A | * | 10/1976 | Arvanitakis | 210/327 |
| 4,608,169 | A | * | 8/1986 | Arvanitakis | 210/334 |
| 7,638,050 | B2 | * | 12/2009 | Kuo | 210/330 |

* cited by examiner

*Primary Examiner* — Benjamin Kurtz (57) ABSTRACT

A water treatment apparatus includes a tank, a driving unit, a filtered-water pipe, a filtering unit and at least one scraping unit. The tank includes a wall, an inlet pipe extending through an upper portion, and an outlet pipe extending from a lower portion. The driving unit is located on an external side of the tank. The filtered-water pipe extends throughout the tank and is connected to the driving unit. The filtering unit includes flat filtering bags located around the filtered-water pipe. The flat filtering bags can be spun together with the filtered-water pipe. The scraping unit includes scrapper assemblies each located between and in contact with two adjacent ones of the flat filtering bags.

11 Claims, 8 Drawing Sheets

WATER TREATMENT APPARATUS

BACKGROUND OF INVENTION

1. Field of Invention

The present invention relates to a water treatment apparatus and, more particularly, to a self-cleaning water treatment apparatus.

2. Related Prior Art

A conventional water treatment apparatus includes a filtering unit with a helically wound filtering film for filtering sludge out of water. To increase an effective area of the filtering unit for intercepting the sludge to increase the throughput of the production of filtered water, flat filtering bags are now used instead of the helically wound filtering film. The flat filtering bags are located along and around a filtered-water pipe. There is no need to provide a rigid shell to close the flat filtering bags. The flat filtering bags are simply located between two plates. Therefore, the effective area of the filtering unit for intercepting sludge is large. The size of the filtering unit consisting of the flat filtering bags is small. Advantageously, unfiltered water travels over the flat filtering bags at high speed and the throughput of the production of the filtered water is high. A water jet is used to wash the sludge away from external faces of the flat filtering bags.

To suppress the forming of filter cakes on the external faces of the flat filtering bags, air is pumped into the water treatment apparatus to increase stirring of the unfiltered water over the external faces of the flat filtering bags. Moreover, the flat filtering bags are spun. Thus, the external faces of the flat filtering bags are moved relative to the unfiltered water. The sludge and particles are removed from the external faces of the flat filtering bags. Hence, the flat filtering bags are not blocked. The throughput of the production of the filtered water is not reduced rapidly. Details of this technique can be found in Taiwanese Patent I312767 for example.

There are various sources of unfiltered water including various undesired substances such as floc, solids and grease used to facilitate cutting. Where the flat filtering bags are used to treat unfiltered water including a lot of grease, the grease sticks the external faces of the flat filtering bags and affects the throughput of the production of the filtered water. Even worse, it is difficult to wash the grease away from the external faces of the flat filtering bags with a water jet. The life of the flat filtering bags is reduced.

The present invention is therefore intended to obviate or at least alleviate the problems encountered in prior art.

SUMMARY OF INVENTION

It is the primary objective of the present invention to provide a self-cleaning water treatment apparatus.

To achieve the foregoing objective, the water treatment apparatus includes a tank, a driving unit, a filtered-water pipe, a filtering unit and at least one scraping unit. The tank includes a wall, an inlet pipe extending through an upper portion, and an outlet pipe extending from a lower portion. The driving unit is located on an external side of the tank. The filtered-water pipe extends throughout the tank and is connected to the driving unit. The filtering unit includes flat filtering bags located along and around the filtered-water pipe. The flat filtering bags can be spun together with the filtered-water pipe. The scraping unit includes scrapper assemblies each located between and in contact with two adjacent ones of the flat filtering bags.

Other objectives, advantages and features of the present invention will be apparent from the following description referring to the attached drawings.

BRIEF DESCRIPTION OF DRAWINGS

The present invention will be described via detailed illustration of three embodiments referring to the drawings wherein.

DETAILED DESCRIPTION OF EMBODIMENTS

Referring to FIGS. 1 to 5, there is shown a water treatment apparatus according to a first embodiment of the present invention. The water treatment apparatus includes a tank 10, a driving unit 20, a filtered-water pipe 30, a filtering unit 40, a scraping unit 50, a positioning unit 60 and a damping unit 70. The tank 10 includes a wall 11 extending around and on a funnel-shaped lower portion. A space 14 is defined by the wall 11 and the lower portion of the tank 10. A cover is located on the wall 11. There is an inlet pipe 12 extending into the space 14 through the cover. Preferably, the inlet pipe 12 extends through a cutout in a corner of the cover. There is an outlet pipe 13 extending from the lower portion of the tank 10. Preferably, the outlet pipe 13 extends from the center of the lower portion of the tank 10.

Figure 1:
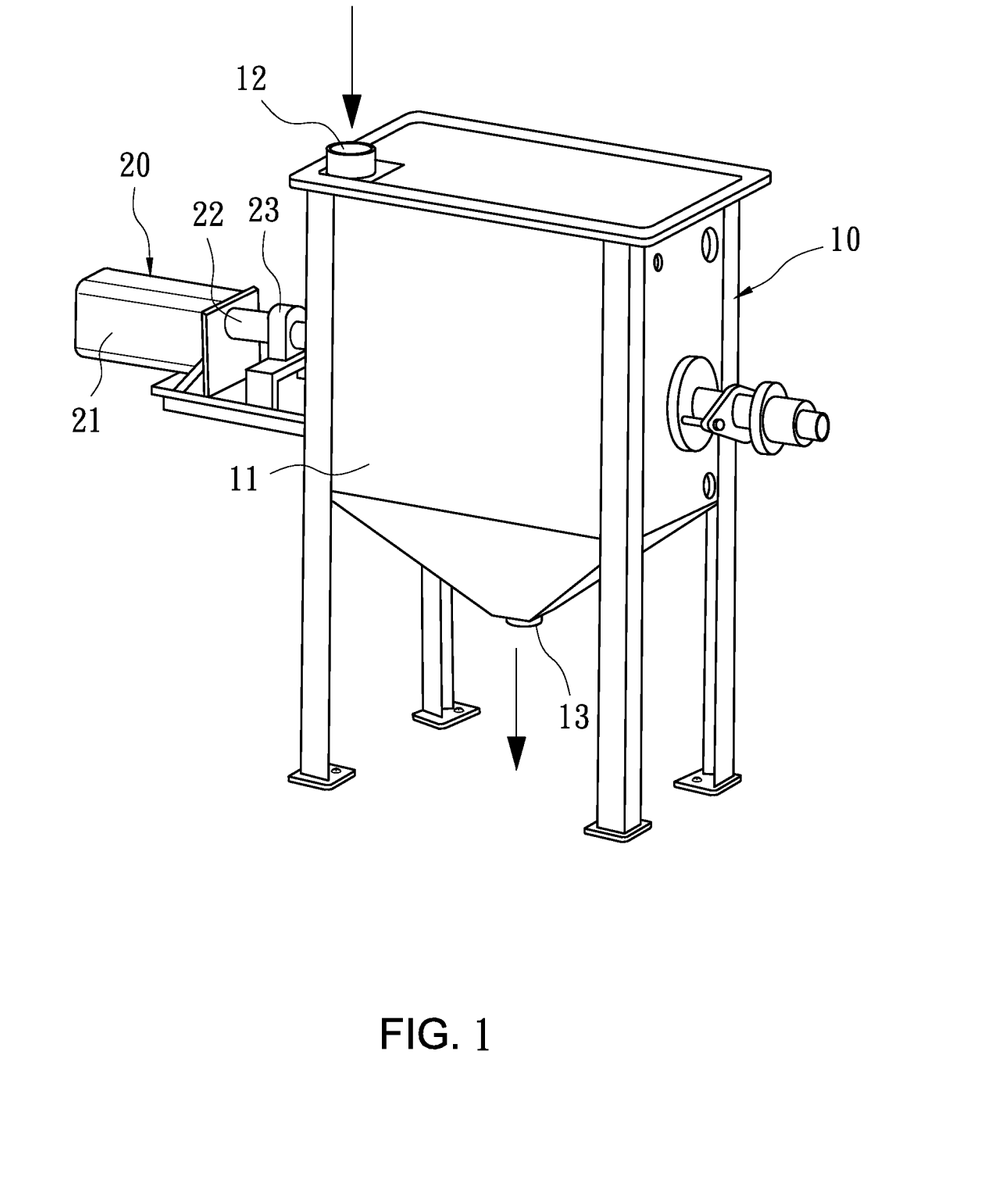
FIG. 1 is a perspective view of a water treatment apparatus according to the first embodiment of the present invention.
Figure 2:
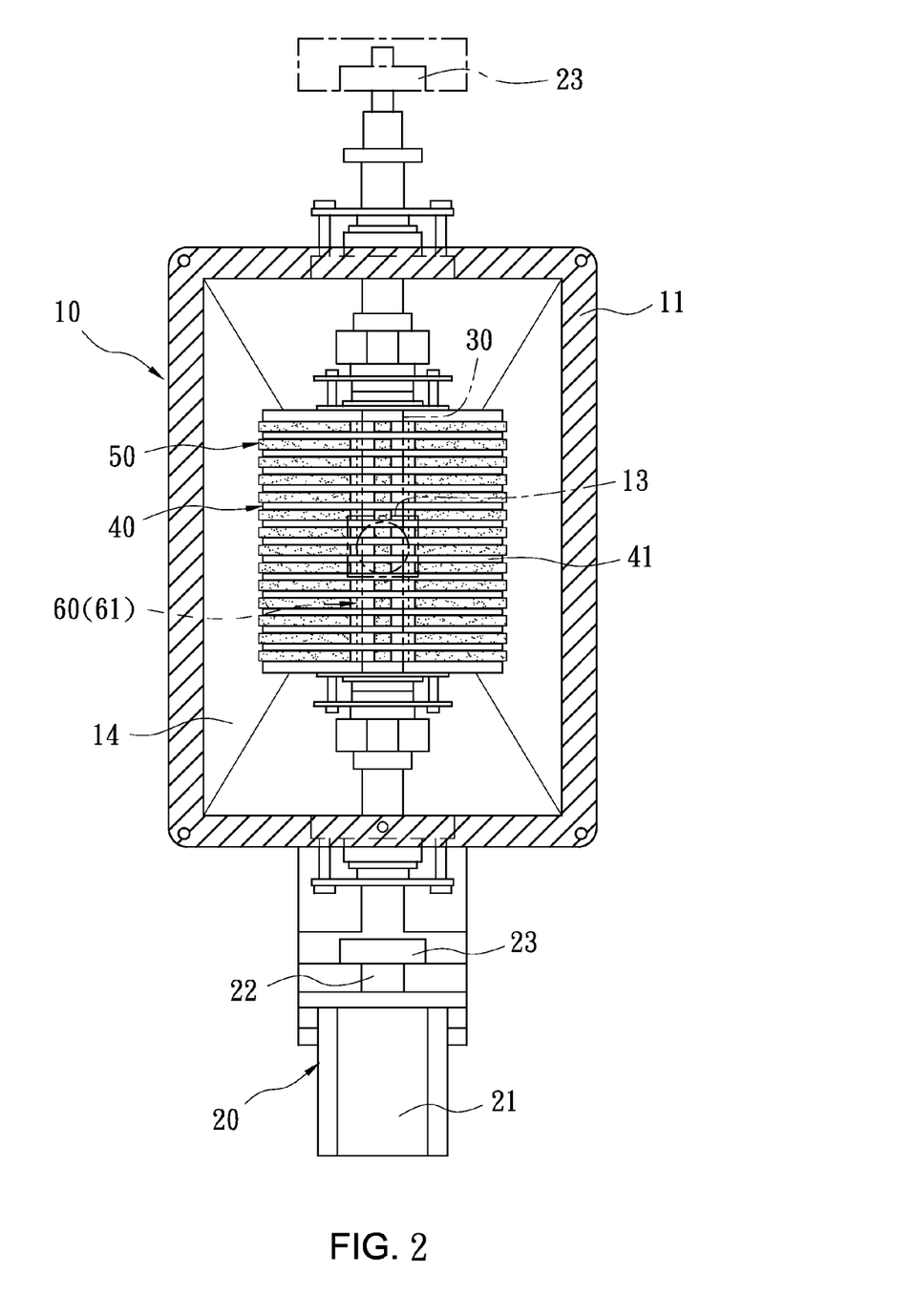
FIG. 2 is a cross-sectional view of the water treatment apparatus shown in FIG. 1.
Figure 3:
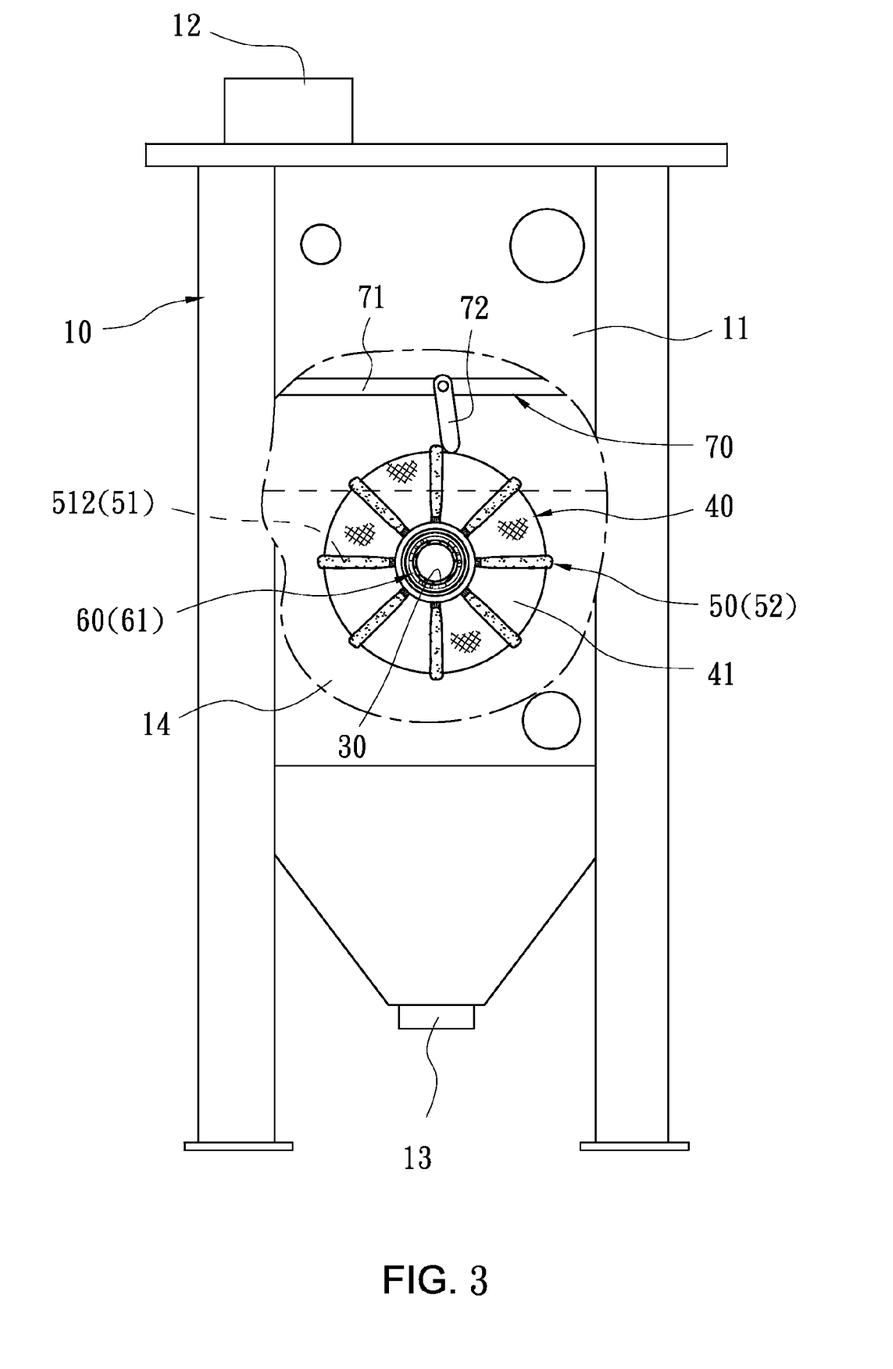
FIG. 3 is a cut-away, side view of the water treatment apparatus shown in FIG. 1.

The driving unit 20 is located on an external side of the wall 11. The driving unit 20 includes a combination 21 of a motor with a reduction gear, an axle 22 extending from the combination 21, and bearings 23 for rotationally supporting the axle 22 and the filtered-water pipe 30, respectively.

The filtered-water pipe 30 includes a middle section horizontally extending in the tank 10 and two terminal sections extending to the exterior of the tank 10 through the wall 11. The filtered-water pipe 30 includes a wall 31 and apertures 32 defined in the wall 31. One of the terminal sections of the filtered-water pipe 30 is connected to the axle 22, and this terminal section of the filtered-water pipe 30 includes a closed end. The other terminal section of the filtered-water pipe 30 includes an open end from which filtered water is released.

Figure 5:
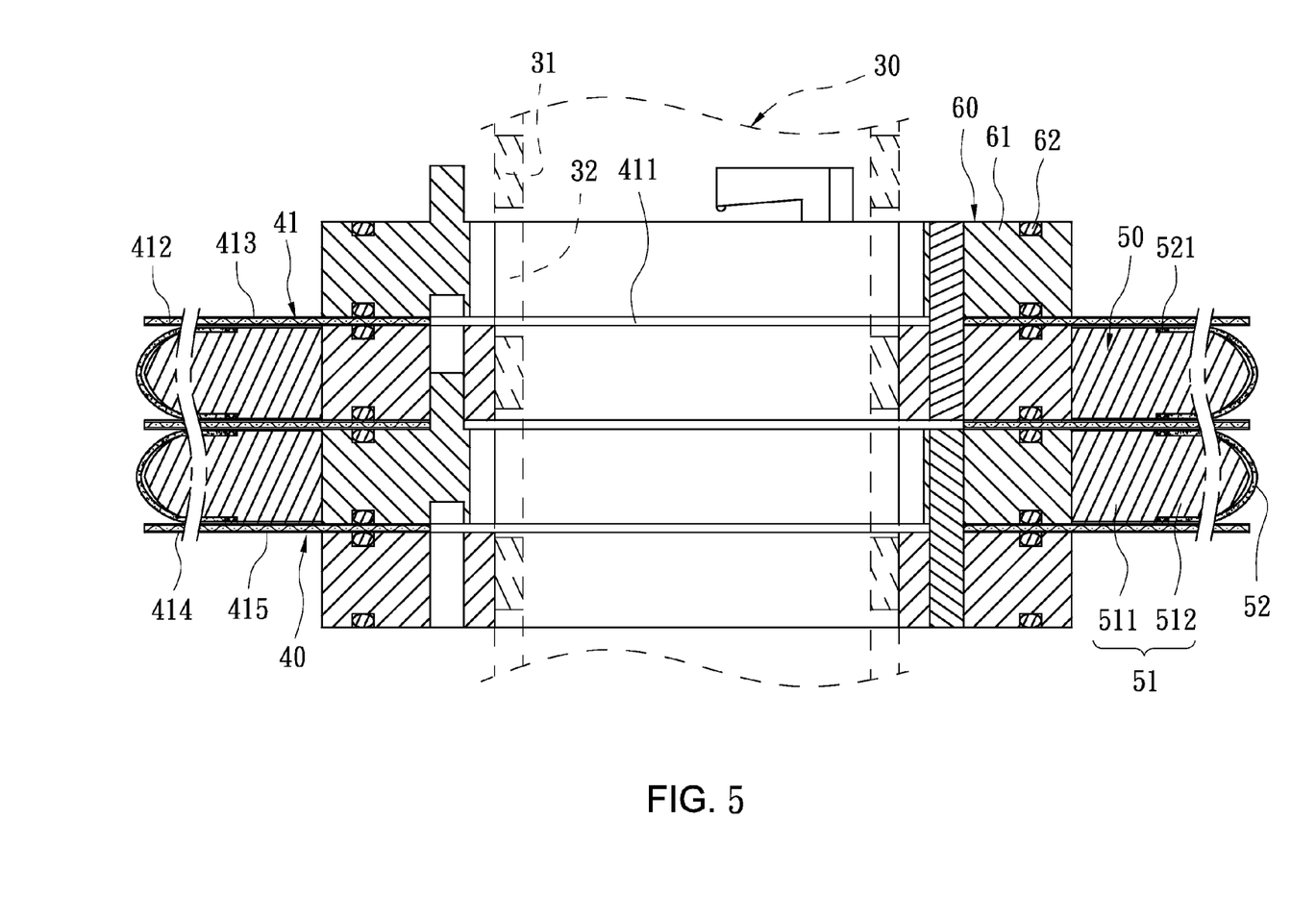
FIG. 5 is a partial, cross-sectional view of the water treatment apparatus shown in FIG. 1.

The filtering unit 40 includes flat filtering bags 41 and bag-supporting elements 411. Each of the flat filtering bags 41 includes two films 413 and 414. The films 413 and 414 include an annular configuration. An external edge of the first film 413 is joined to that of the second film 414. Thus, a space 415 is defined between the films 413 and 414. The space 415 includes an opening 411 defined between an internal edge of the first film 413 and that of the second film 414.

Each of the bag-supporting elements 412 is sandwiched between the films 413 and 414 of a related one of the flat filtering bags 41 to support the films 413 and 414 and retain the space 415. The bag-supporting elements 412 also include an annular configuration. An external edge of each bag-supporting element 412 is joined to the external edges of the films 413 and 414 of the related flat filtering bag 41. The bag-supporting element 412 is preferably a plastic net.

In assembly, the tube 30 is inserted through the filtering unit 40. Thus, the apertures 32 are in communication with the spaces 415 through the openings 411.

The positioning unit 60 includes separators 61 alternately arranged with the flat filtering bags 41. Thus, the flat filtering bags 41 are separated from one another by the separators 61. Each of the separators 61 is formed with a buckle engaged with an upper one of the separators 61. Thus, the flat filtering bags 41 are positioned by the separators 61. A seal 62 is attached to each of two opposite sides of each of the separators 61. Each of the seals 62 is in water-tight contact with an external face of a related one of the films 413 and 414 of a related one of the flat filtering bags 41. Thus, unfiltered water cannot travel into the filtered-water pipe 30 via gaps between the flat filtering bags 41.

Figure 4:
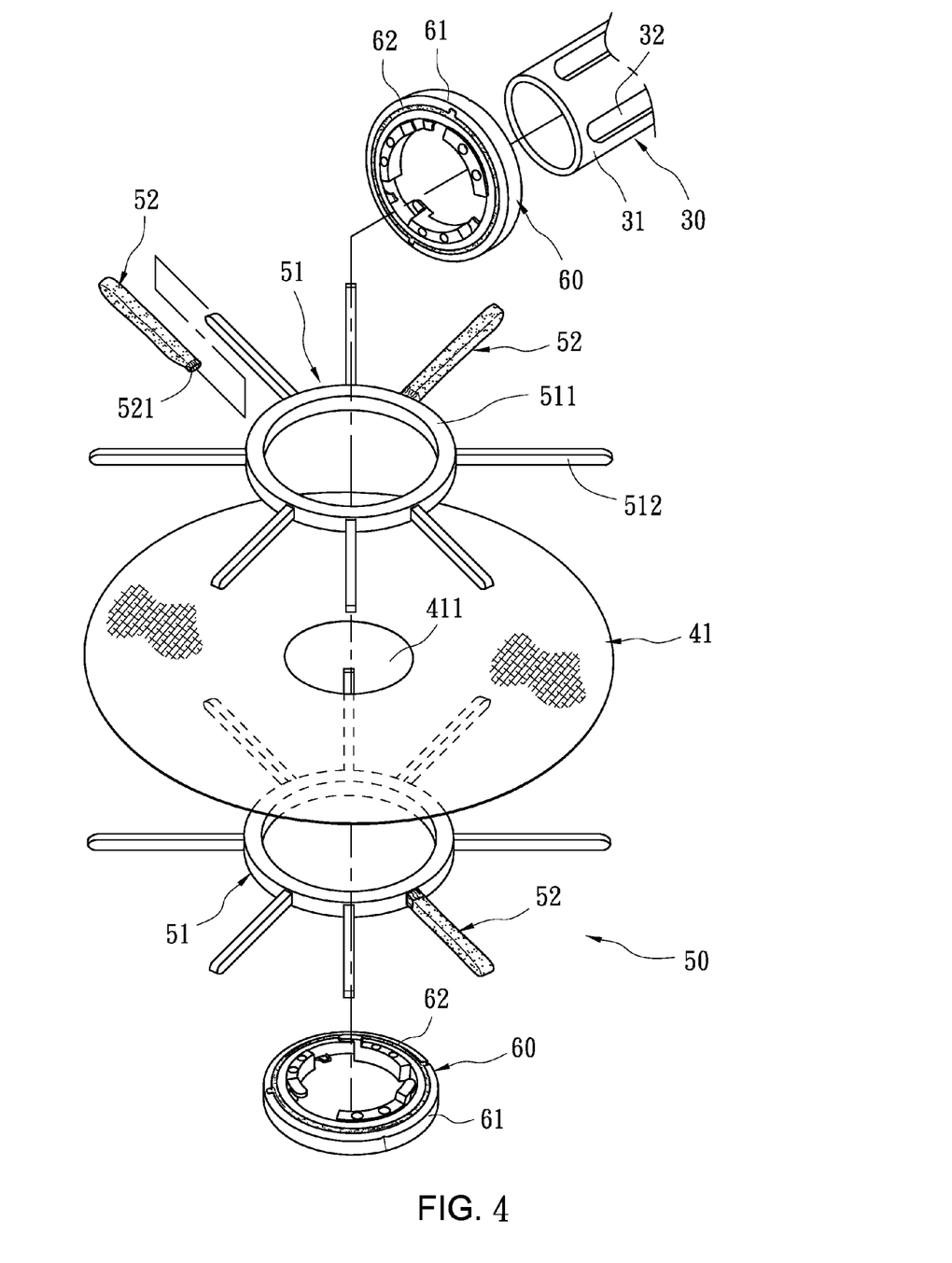
FIG. 4 is an exploded view of a scraping unit of the water treatment apparatus shown in FIG. 3.

The scraping unit 50 includes scrapper assemblies 51 each located between two adjacent ones of the flat filtering bags 41. Each of the scrapper assemblies 51 is in contact with an external face of the first film 413 of an adjacent one of the flat filtering bags 41 and an external face of the second film 414 of another adjacent one of the flat filtering bags 41. Each of the scrapper assemblies 51 includes a hub 511, spokes 512 extending from the hub 511, and wipers 52 each provided on a related one of the spokes 512. Each of the wipers 52 is in the form of a sleeve provided around the related spoke 512. Each of the wipers 52 includes a rubber band 521 provided at an open end thereof. The rubber bands 521 keep the wipers 52 on the spokes 512. The wipers 52 may be made of unwoven cloth of sponge.

The damping unit 70 includes a bar 71 and rockers 72. The bar 71 is located in the tank 10. Each of the rockers 72 includes an end pivotally connected to the bar 71 and another end for contact with the spokes 512 of a related one of the scrapers 51.

In use, unfiltered water is let into the tank 10 through the inlet pipe 12. The unfiltered water is forced through the flat filtering bags 41 and turned into filtered water while sludge is filtered out and left on the external faces of the films 413 and 414 of the flat filtering bags 41. The filtered water is sent into the filtered-water pipe 30 from the flat filtering bags 41 via the openings 411 and the apertures 31. The filtered water is sent into another tank from the filtered-water pipe 30 by suction.

To scrap the sludge from the external faces of the films 413 and 414 of the flat filtering bags 41, the filtering unit 40 is spun relative to the scraping unit 50, i.e., the flat filtering bags 41 are spun relative to the scrapper assemblies 51. In fact, both of the filtering unit 40 and the scraping unit 50 are spun but the filtering unit 40 is spun faster than the scraping unit 50. Thus, the sludge is scrapped from the external faces of the films 413 and 414 of the flat filtering bags 41 by the scrapper assemblies 51. Then, the sludge is removed from the tank 10 through the outlet pipe 13.

It should be noted that the spokes 512 of each scrapper assembly 51 are damped by and then released from the related rocker 72. Hence, the speed difference between the films 413 and 414 of the flat filtering bags 41 and the wipers 52 of the scrapper assemblies 51 are increased intermittently to improve the scraping of the sludge from the flat filtering bags 41 by the scrapper assemblies 51.

Figure 6:
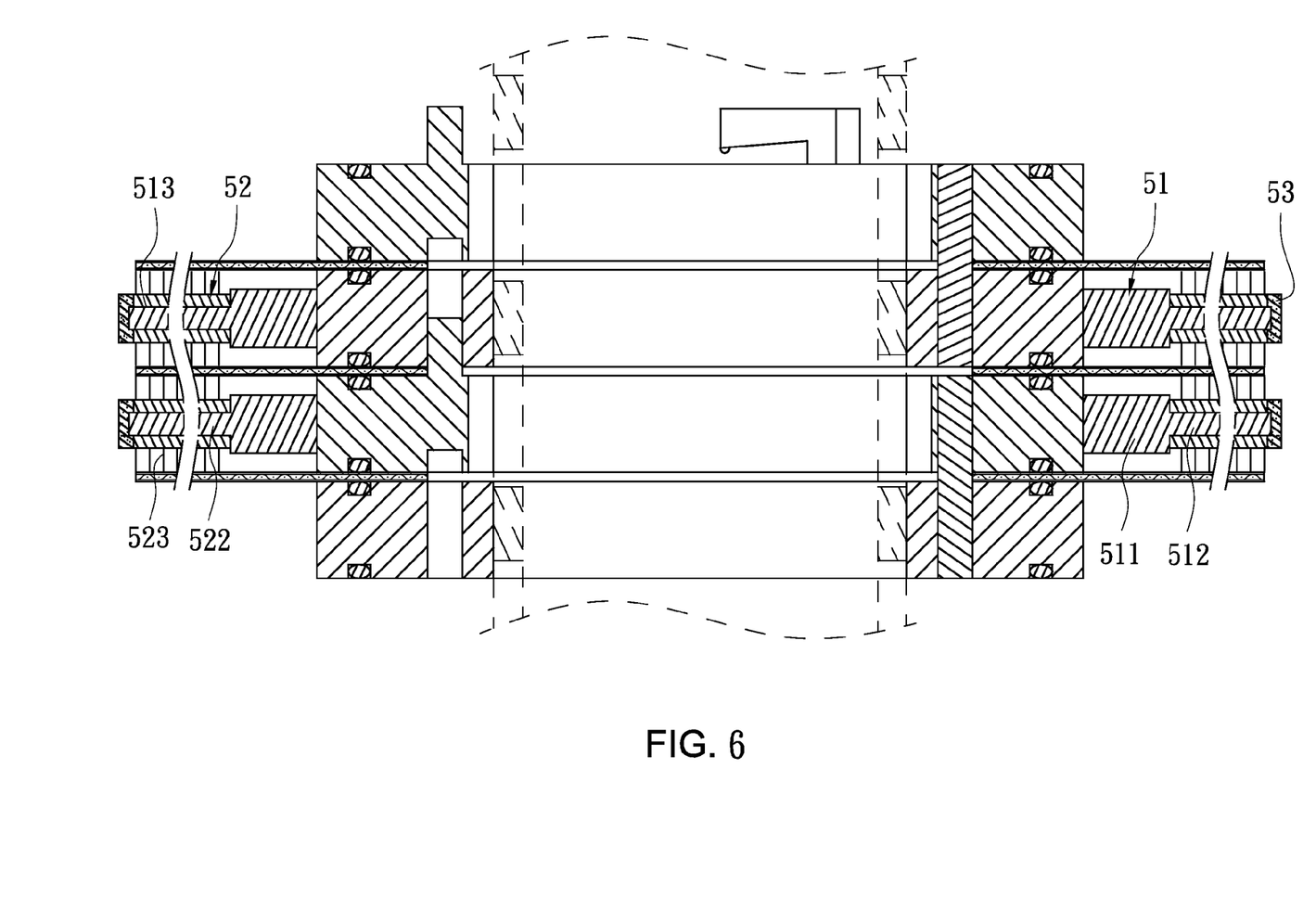
FIG. 6 is a partial, cross-sectional view of a water treatment apparatus according to the second embodiment of the present invention.
Figure 7:
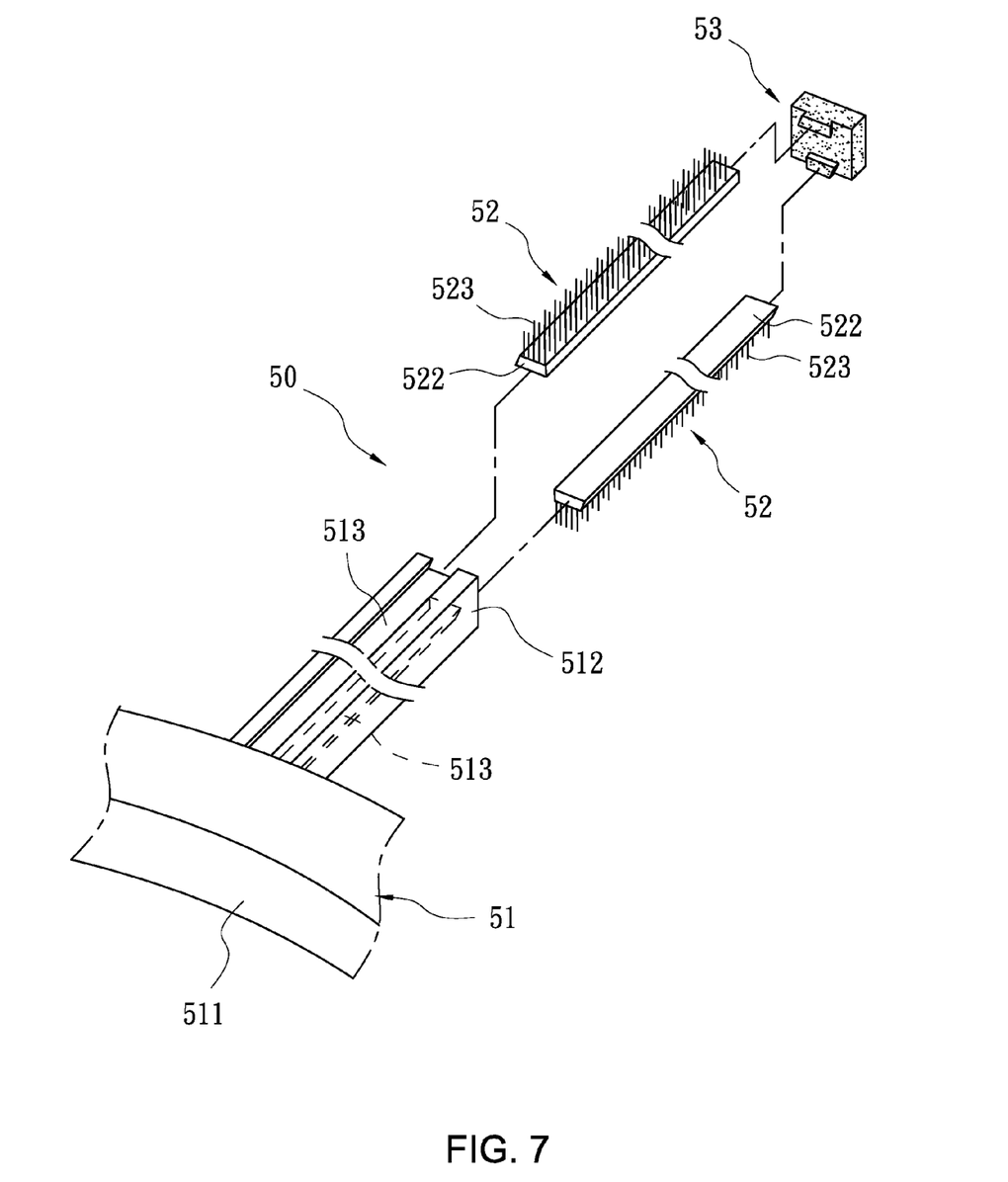
FIG. 7 is an exploded view of a scraping unit of the water treatment apparatus shown in FIG. 6.

Referring to FIGS. 6 and 7, there is shown a scrapping unit 50 according to a second embodiment of the present invention. The second embodiment is identical to the first embodiment except including two brushes 52 instead of each of the wipers 52. To this end, each of the spokes 512 includes two dovetail grooves 513 each defined in a related one of two opposite sides thereof. Each of the brushes 52 includes a slab 522 inserted in a related one of the dovetail grooves 513 and bristles 523 provided on the slab 522. The second embodiment may further include a plug 53 for use with each spoke 512. The plug 53 includes two blocks fit in the dovetail grooves 513 of the related spoke 512, thus keeping the related brushes 52 on the related spoke 512.

Figure 8:
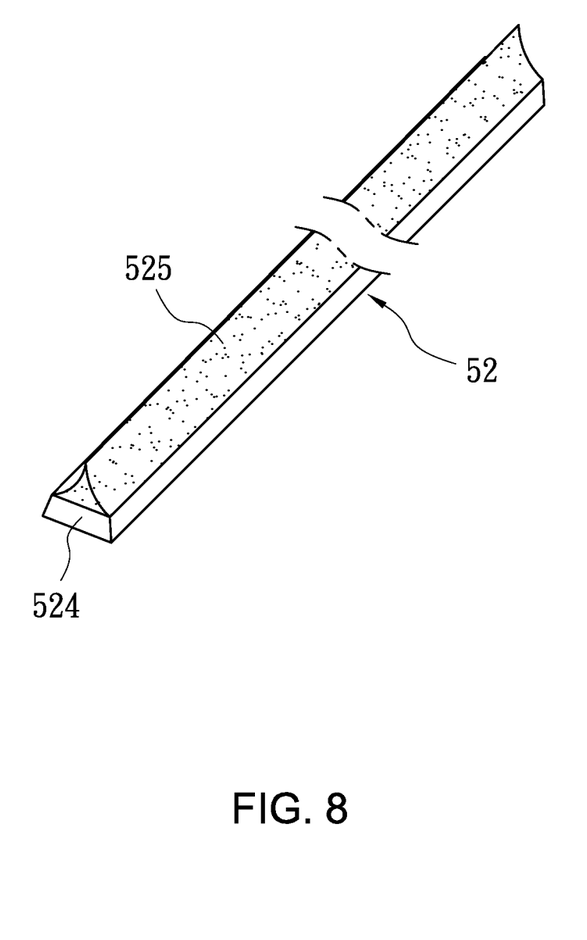
FIG. 8 is a perspective view of a scraping unit of a water treatment according to the third embodiment of the present invention.

Referring to FIG. 8, there is shown a scrapping unit 50 according to a third embodiment of the present invention. The third embodiment is identical to the second embodiment except including a scrapper 52 instead of each of the brushes 52. The scrapper 52 includes a slab 524 inserted in a related one of the dovetail grooves 513 and a blade 525 provided on the slab 524. The slab 524 is like the slab 522. The blade 525 is made of rubber.

The present invention has been described via the detailed illustration of the embodiments. Those skilled in the art can derive variations from the embodiments without departing from the scope of the present invention. Therefore, the embodiments shall not limit the scope of the present invention defined in the claims.

The invention claimed is:

1. A water treatment apparatus including:
   a tank includes an inlet pipe extending through an upper portion, and an outlet pipe extending from a lower portion;
   a driving unit located on an external side of the tank;
   a filtered-water pipe inserted through the tank and connected to the driving unit;
   a filtering unit including flat filtering bags located around the filtered-water pipe, wherein the flat filtering bags can be spun together with the filtered-water pipe;
   a positioning unit including:
   separators each sandwiched between two adjacent ones of the flat filtering bags; and
   seals each attached to a related one of the separators and in contact with a related one of the flat filtering bags; and
   a scraping unit including scrapper assemblies each sandwiched between two adjacent ones of the flat filtering bags and rotationally provided around a related one of the separators;
   wherein each of the scrapper assemblies includes a hub and spokes extending from the hub;
   wherein each of the scrapper assemblies includes a wiper connected to each of the spokes;
   wherein the wiper is a sleeve provided around the related spoke.

2. The water treatment apparatus according to claim 1, wherein each of the flat filtering bags includes a first film, a second film and a bag-supporting element located between the first and second films, wherein an external edge of the first film, an external edge of the second film and an external edge of the bag-supporting element are joined together.

3. The water treatment apparatus according to claim 1, wherein the wiper is made of a material selected from the group consisting of unwoven cloth and sponge.

4. The water treatment apparatus according to claim 1, further including a damping unit for intermittently damping the spokes.

5. The water treatment apparatus according to claim 4, wherein the damping unit includes a bar located in the tank and rockers each including an end pivotally connected to the bar and another end for intermittent contact with the spokes of a related one of the scrapper assemblies.

6. The water treatment apparatus according to claim 1, wherein the outlet pipe is located in a center of a lower portion of the tank.

7. The water treatment apparatus according to claim 1, wherein the section of the filtered-water pipe that is connected to the driving unit is closed.

8. The water treatment apparatus according to claim 1, wherein the driving unit includes a motor/reduction combination and an axle for connecting the combination to the filtered-water pipe.

9. A water treatment apparatus including:
- a tank includes an inlet pipe extending through an upper portion, and an outlet pipe extending from a lower portion;
- a driving unit located on an external side of the tank;
- a filtered-water pipe inserted through the tank and connected to the driving unit;
- a filtering unit including flat filtering bags located around the filtered-water pipe, wherein the flat filtering bags can be spun together with the filtered-water pipe;
- a positioning, unit including:
- separators each sandwiched between two adjacent ones of the flat filtering bags; and
- seals each attached to a related one of the separators and in contact with a related one of the flat filtering bags; and
- a scraping unit including scrapper assemblies each sandwiched between two adjacent ones of the flat filtering bags and rotationally provided around a related one of the separators;
- wherein each of the scrapper assemblies includes a hub and spokes extending from the hub;
- wherein each of the scrapper assemblies includes two brushes connected to each of the spokes and each of the spokes includes two dovetail grooves defined in two opposite sides, wherein each of the brushes includes a slab inserted in a related one of the dovetail grooves and bristles provided on the slab.

10. The water treatment apparatus according to claim 9, wherein each of the scrapper assemblies includes a plug for keeping the slabs on each of the spokes.

11. A water treatment apparatus including:
- a tank includes an inlet pipe extending through an upper portion, and an outlet pipe extending from a lower portion;
- a driving unit located on an external side of the tank;
- a filtered-water pipe inserted through the tank and connected to the driving unit;
- a filtering unit including flat filtering bags located around the filtered-water pipe, wherein the flat filtering bags can be spun together with the filtered-water pipe;
- a positioning, unit including:
- separators each sandwiched between two adjacent ones of the flat filtering bags; and
- seals each attached to a related one of the separators and in contact with a related one of the flat filtering bags; and
- a scraping unit including scrapper assemblies each sandwiched between two adjacent ones of the flat filtering bags and rotationally provided around a related one of the separators;
- wherein each of the scrapper assemblies includes a hub and spokes extending from the hub;
- wherein each of the scrapper assemblies includes two scrappers connected to each of the spokes and each of the spokes includes two dovetail grooves defined in two opposite sides, wherein each of the scrappers includes a slab inserted in a related one of the dovetail grooves and a blade provided on the slab.

* * * * *